UNITED STATES PATENT OFFICE 2,521,267

METHOD OF ALKYLATING ALKOXY SILANES

Leonhard Tiganik, Skoghall, Sweden, assignor to Uddeholms Aktiebolag, Uddeholm, Sweden, a corporation of Sweden No Drawing. Application August 23, 1948, Serial No. 45,788. In Sweden September 8, 1947

7 Claims. (Cl. 260—448.8)

In the introduction of alkyl groups into organic compounds by the use of an alkylating agent in the presence of an alkali metal it has at times proved to be very difficult or even impossible, to carry out the reaction if an alkyl chloride is used as alkylating agent, whereas the corresponding reaction is carried out very easily if a bromide or iodide is used instead of the chloride.

I have found that tetraethyl orthosilicate may be easily phenylated according to the following reaction equation:

(1)  $Si(OC_2H_5)_4 + 2Na + C_6H_5Cl \rightarrow$
$C_6H_5Si(OC_2H_5)_3 + NaCl + NaOC_2H_5$ However, if in this reaction phenyl chloride is replaced by methyl chloride and you try to carry out the following alkylating reaction (2)  $Si(OC_2H_5)_4 + 2Na + CH_3Cl \rightarrow$
$CH_3Si(OC_2H_5)_3 + NaCl + NaOC_2H_5$ it will be found that the reaction hardly takes place.

I have made a great number of attempts to vary the solvent and the reaction temperature in order thereby to obtain the corresponding reaction while using alkyl chloride but all these attempts have been without success. It has been investigated whether it is possible to activate the reaction in some way so that it could be possible to carry out the alkylating reaction while using alkyl chloride. It has been found possible to solve this problem by using—instead of ordinary sodium metal—a sodium metal which has been activated with a small quantity of copper, tin, silver or other suitable metal. The present invention which relates to a method of introducing alkyl groups into organic compounds by bringing said organic compounds to react with an alkylating agent in the presence of an alkali metal is characterized by the fact that an alkyl chloride is used as alkylating agent and that the used alkali metal is activated with a small quantity of copper, silver, tin or some other suitable metal.

The activated alkali metal may for example, be produced in the manner described in my copending application Serial No. 45,787, filed August 23, 1948. However, it is also possible to add a pure alkali metal and then add copper, tin, silver and so forth, preferably in the form of amalgam, in the reaction vessel.

Example

In a reaction vessel which is provided with heating and cooling jacket, stirrer, thermometer and gas introduction pipe, are added 15 kilograms of tetraethyl orthosilicate and 1 kilogram of sodium. Then one introduces a slow flow of oxygen-free, dry nitrogen gas and begins to heat the reaction vessel, yet without stirring. When the sodium has melted, 10 grams of copper amalgam are added and the mixture is stirred cautiously without dispersing the sodium until the copper amalgam has been homogeneously distributed. Then one stirs strongly so that the sodium becomes finely divided and thereafter one begins to introduce dry methyl chloride. The gas introduction speed may quickly be raised to about 100 litres/hour; all methyl chloride is absorbed. Towards the end of the reaction the gas introduction speed must be reduced. The reaction temperature is held at about 120° C. During the main reaction period one must cool strongly. At the beginning and towards the end of the reaction the heat losses must be compensated.

In order to obtain a sodium chloride precipitate which is easy to filter and to wash, it is suitable to decompose the formed sodium alcoholate, not after but during the reaction. For this purpose the methyl chloride is most suitably saturated at 20° C. with silicium tetrachloride before introducing it into the reaction vessel. In this case also a neutralization reaction takes place collaterally with the alkylation reaction;

(3)  $4C_2H_5ONa + SiCl_4 \rightarrow Si(OC_2H_5)_4 + 4NaCl$

When the reaction is finished the reaction vessel is cooled and emptied. The reaction product is purified from precipitated sodium chloride by filtration, and is fractionated.

This method gives a yield calculated on the used sodium, of about 85% of the theoretical one, the main product consisting of methyl triethoxy silane. Moreover, some dimethyl-diethoxy-silane and a very small quantity of trimethylethoxy-silane are formed.

A similar result is obtained if, instead of copper, tin, silver or some other suitable metal separately or together with copper is used for activating the sodium.

I claim:

1. A method of alkylating alkoxy silanes by means of alkyl chloride in which the alkyl chloride is brought to reaction with the alkoxy silane in the presence of sodium which is activated with a small amount of at least one of the metals of the group consisting of copper, tin and silver.

2. A method as claimed in claim 1 in which said sodium is activated by alloying same with an amalgam of at least one of the metals of the group consisting of copper, tin and silver.

3. A method as claimed in claim 1 in which said sodium is activated prior to its admixture to the other reaction components.

4. A method of alkylating an alkoxy silane in which metallic sodium is molten within said alkoxy silane, an amalgam of at least one of the metals of the group consisting of copper, tin and silver is added under cautious stirring until said amalgam has been homogeneously distributed in said molten sodium, after which the stirring is increased so that the sodium alloy obtained is finely distributed throughout said alkoxy silane and finally an alkyl chloride is added.

5. A method according to claim 4 in which an acid substance is added to the reaction mass after the reaction is completed in order to break up the slimy consistency resulting from the alcoholates formed and thus making the mass more easily filterable.

6. A method according to claim 4 in which the alkyl chloride is added in admixture with an acid substance in order quickly to neutralize sodium alcoholate formed during the reaction thereby making the reaction product more easily filterable.

7. A method as claimed in claim 6 in which the acid substance added with the alkyl chloride consists of silicon tetrachloride.

LEONHARD TIGANIK.

REFERENCES CITED

The following references are of record in the file of this patent:

UNITED STATES PATENTS

| Number | Name | Date |
|---|---|---|
| 2,386,452 | Fleming | Oct. 9, 1945 |

FOREIGN PATENTS

| Number | Country | Date |
|---|---|---|
| 573,906 | Great Britain | Dec. 12, 1945 |

OTHER REFERENCES

Klippert: "Berichte der Deut. Chem. Gessel.," vol. 8 (1875), page 713.